UNITED STATES PATENT OFFICE.

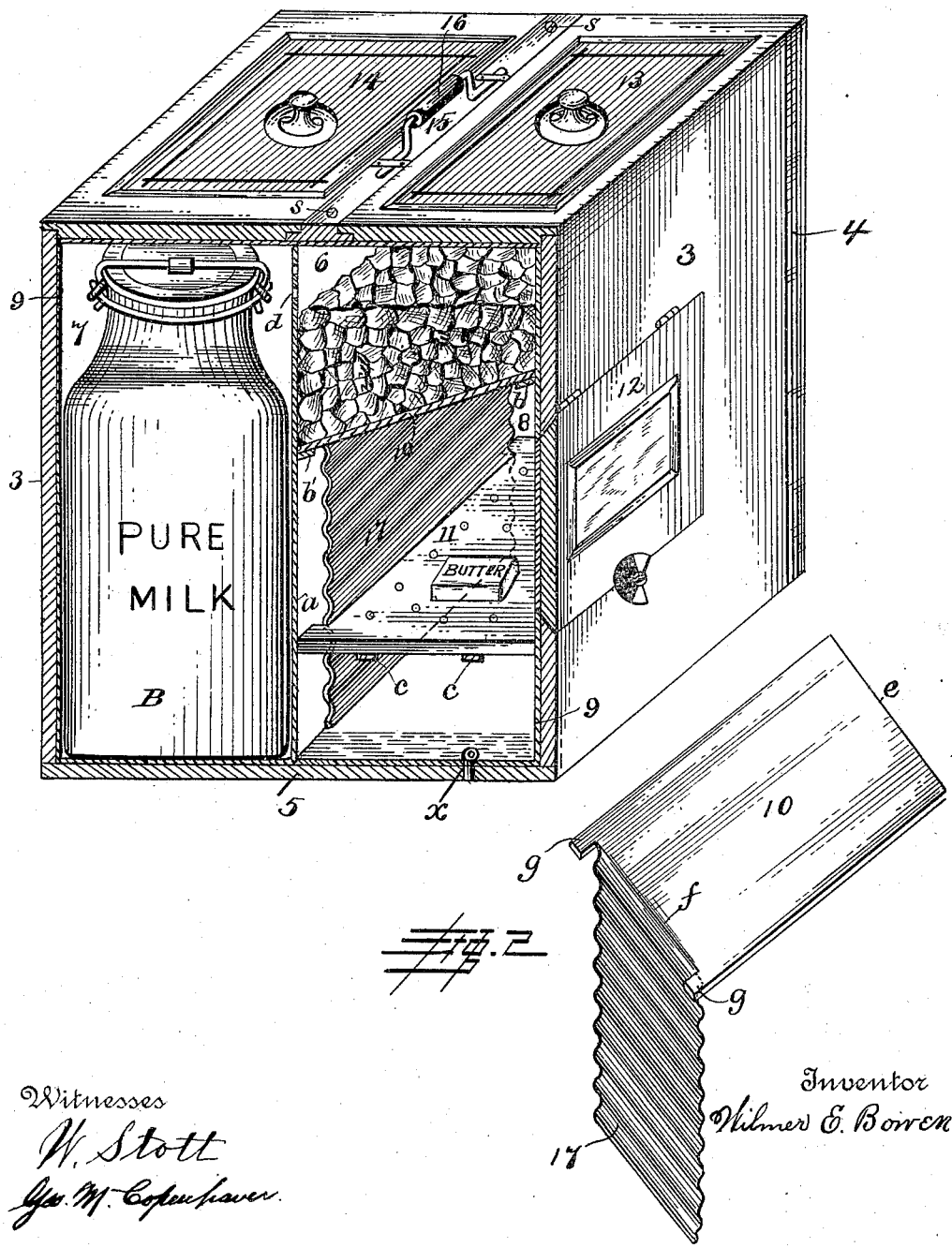

WILMER E. BOWEN, OF NEW YORK, N. Y.

PORTABLE REFRIGERATOR.

SPECIFICATION forming part of Letters Patent No. 687,718, dated December 3, 1901.

Application filed March 26, 1897. Serial No. 629,435. (No model.)

*To all whom it may concern:*

Be it known that I, WILMER E. BOWEN, a citizen of the United States, residing at New York city, in the county of New York and State of New York, have invented certain new and useful Improvements in Portable Refrigerators; and I do hereby declare the following to be a full, clear, and exact description of the invention, such as will enable others skilled in the art to which it appertains to make and use the same.

This invention relates to portable refrigerators; and its object is to devise a portable refrigerator-box adapted for keeping milk at a uniform temperature from the time it is bottled at the dairy till it is disposed of by the consumer.

A further object is to combine, in a portable refrigerator-box, a compartment for the milk-receptacle, a compartment for butter, and a compartment for ice. The advantages of keeping milk at a uniform temperature are well known, and the desirability of a family refrigerator-box which shall be adapted to preserve the milk in a sweet and wholesome condition and also receive and keep firm and sweet and free from contamination by other articles of food or other substances a moderate quantity of butter must be appreciated, especially by those whose necessities require them to purchase butter in small quantities. Butter is often dealt in by milk dealers and is carried by the milk-delivery wagons. A scheme which contemplates the delivery of milk from the dairy direct to the consumer in bottles inclosed in small portable refrigerator-boxes could be combined advantageously both to dealer and consumer with the mode herein suggested of delivering butter. The refrigerator-boxes will be supplied with ice when the milk and butter are placed therein at the dairy, and the quantity of ice will be sufficient to last at least twenty-four hours or until the boxes are taken up by the driver when leaving a fresh supply of milk each day. By this plan neither the milk nor butter will be handled or disturbed in any way by the driver delivering the same, as all the packing is done at the dairy. Thus perfect cleanliness is assured, which with respect to the articles of food in question is very important to health.

My invention will now be described, and the features of novelty for which protection by Letters Patent is desired will be pointed out in the claims at the end hereof.

In the accompanying drawings, forming part of this specification, and in which like parts are indicated by like letters and figures of reference in both views, Figure 1 is a perspective sectional view of a refrigerator-box embodying my improvements; and Fig. 2 is a view in perspective of the ice-tray and its depending apron or drip-receiver, the latter in this instance being shown corrugated, but the same may have a smooth surface.

Referring to the drawings, 3 indicates the ends of the box, 4 one of its sides, (the other side not being shown,) and 5 the bottom of the box. The box, which will be made of any suitable material, is divided into three compartments—an ice-compartment 6, milk-receptacle compartment 7, and butter-compartment 8, as shown. The milk-receptacle compartment 7 is placed at one side of the box and is as deep as the box is high—that is, sufficiently deep to receive in an upright position the milk-bottle B. The bottle ordinarily used will have the capacity of a quart; but larger or smaller bottles may be employed and the dimensions of the box made to conform thereto. The ice-compartment 6 occupies the upper part of the inclosure to one side of the milk-receptacle compartment, and beneath the ice-compartment is arranged the butter-compartment 8. This is one desirable disposition of the three compartments when arranged within a single inclosure.

When the dimensions of the box have been selected and the sides, ends, and bottom of the box put together, I furnish the box with a lining of zinc or other suitable material, (indicated by 9.) This lining is stamped up so as to make a perfectly water-tight vessel with waste-outlet $x$ at bottom and is divided to make two chambers of dimensions sufficient for each one to occupy about one-half of the interior of the box, as shown, the side $a$ of said lining serving as the division-wall between the milk-receptacle chamber and the other compartments of the box. Interiorly the lining 9 and part $a$ are provided with ledges $b\ b'$, which support the ice-tray 10, shown removed from the box in Fig. 2, and ledges c c, which support the butter-shelf 11. That end of the box adjacent to butter and ice compartments is provided with an opening below the ice-tray, which is closed by a door 12, through which door access is had to the butter-compartment, the lining 9 being cut out to make an opening therein corresponding with the opening which door 12 closes. The inner surface of door 12 is also lined with metal in the usual manner. Access is had to the ice-compartment 6 through door 13 and access to the milk-receptacle compartment 7 through door 14. The several compartments are thus provided with independent doors, which construction avoids the necessity of exposing to the atmosphere any compartment unnecessarily.

The stationary piece 15 between the two doors 13 and 14 is provided for receiving the handle 16, by which the box is carried. The piece 15 is secured to the edge of the sides of the box by screws s, so as to be easily removed when necessity may exist for taking out lining 9. The handle 16 may be of any description suitable for the purpose. The milk-receptacle compartment is also provided with a lining having three sides and a bottom and is removably secured in the box without tacks or other fastening means, the same as lining 9. The division-wall a of lining 9 is perforated at its top, as at d, above the ice-line to permit the cold air to circulate between compartments 6 and 7.

The ice-tray 10, the shape of which is seen in Fig. 2, is preferably formed of a single piece of metal of the required stiffness. Its front edge e is adapted to rest on ledge b of lining 9, and from its edge e the tray slopes downward toward the division a of said lining and rests at its lower edge on the ledge b'. The lower edge of the tray 10 is cut out, as seen at f, Fig. 2, leaving two projecting pieces g for supporting the tray on the ledge b'. From the edge of the cut-away portion f of the tray 10 I propose to suspend an apron 17 to receive the drippings from the ice. This apron 17 may be made integral with the tray 10, as shown in Fig. 2, or may consist of a separate piece of material, and its surface may be plain or it may be corrugated transversely. The butter-shelf 11 is cut away at its rear to permit the apron to pass below said shelf, as seen in Fig. 1. The apron extends to within a few inches of the bottom of the box.

The joints of the several doors may be packed as doors of ice-chambers are often packed to prevent the entrance of external air. The butter-shelf 11 is sufficiently elevated above the bottom of the box to avoid all liability of the water, that accumulates in the box from the melting ice, affecting the butter. The metallic bottom of the ice-chamber, with the ice resting thereon, will become and remain as cold on its under surface as on its upper surface, and cold air will be distributed therefrom directly into the butter-chamber 8. As the dripping from the ice is received upon the depending apron 17 the same passes slowly down toward the bottom of the box, the descent being greatly retarded when the apron is corrugated, as shown; and the cold of the dripping and moisture will thus be extracted instead of being conveyed away with the water as a vehicle.

By the above-described construction the ice-compartment is at the top of the box, which is the most desirable position for it, and the butter-chamber is adapted to be cooled to a lower temperature than is the milk-receptacle chamber, which is also desirable, though the temperature of the milk-receptacle chamber will be such as to keep the milk cool without any liability of its freezing.

The refrigerator-box is easily cleaned, as the linings are removable, as are also the ice-tray and butter-shelf. The box is well adapted to preserve in a convenient, cleanly, and economical manner the usual milk and butter supply of a family, and the expense of making the box is so slight that a dairy company could readily afford to make use of it, and thus give its patrons much superior service to any now afforded by the present modes of milk and butter deliveries.

The butter-compartment may, it is obvious, be used for cooling various articles of food, and the milk-chamber may be employed to cool other bottled substances than milk. The refrigerator-box may be used in restaurants, eating-houses, and the like for milk or other articles of food.

For small dairies and grocery stores I propose to make this refrigerator-box sufficiently large to enable the milk-receptacle compartment 7 to receive a large can of milk, holding, say, from five to ten gallons, and the butter-compartment to contain a keg of butter of from twenty-five to forty pounds. Such a box will be found of great convenience and very economical in ice. The milk-can not being in direct contact with the ice, the milk is thus kept at a desirable temperature.

Having thus described my invention, what I claim as new, and desire to secure by Letters Patent, is—

1. A portable refrigerator comprising an inclosure provided with two independent compartments having a mutual vertical partition a, a door in the top of each compartment and a handle between said doors to carry said refrigerator, one of said compartments having three superposed chambers, the water-chamber being in the bottom, the top chamber having for a floor an inclined removable ice-tray notched in its lower end and an apron 17 pendent therefrom, and a horizontal shelf 11 thereunder having one edge notched for the passage of the apron 17 substantially as described.

2. A refrigerator comprising a metal-lined inclosure provided with two independent compartments having a mutual vertical partition *a* provided with perforations *d*, one of said compartments having three superposed chambers, the middle chamber having a door in one side, and the top chamber having for a floor a removable inclined ice-tray notched in its lower end, and an apron 17 pendent therefrom, the horizontal shelf 11 of the middle chamber having one edge notched for the passage of the pendent apron 17 substantially as described.

In testimony whereof I affix my signature in presence of two witnesses.

WILMER E. BOWEN.

Witnesses:
HELEN E. PARKER,
WELLINGTON STOTT.